United States Patent
Song et al.

(10) Patent No.: US 11,920,807 B2
(45) Date of Patent: Mar. 5, 2024

(54) ELECTRONIC APPARATUS AND METHOD TO TRAIN NEURAL NETWORK TO DETERMINE DEFECTIVE AIR CONDITIONER

(71) Applicant: Samsung Electronics Co., Ltd., Suwon-si (KR)

(72) Inventors: Sunggeun Song, Suwon-si (KR); Kyungjae Kim, Suwon-si (KR); Kwanwoo Song, Suwon-si (KR); Jehyeon Lee, Suwon-si (KR); Hyejung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 207 days.

(21) Appl. No.: 17/428,125

(22) PCT Filed: Jul. 27, 2021

(86) PCT No.: PCT/KR2021/009677
§ 371 (c)(1),
(2) Date: Aug. 3, 2021

(87) PCT Pub. No.: WO2022/039400
PCT Pub. Date: Feb. 24, 2022

(65) Prior Publication Data
US 2022/0316731 A1    Oct. 6, 2022

(30) Foreign Application Priority Data
Aug. 20, 2020  (KR) .................. 10-2020-0104395

(51) Int. Cl.
*F24F 11/38*     (2018.01)
*F24F 11/52*     (2018.01)
(Continued)

(52) U.S. Cl.
CPC .............. *F24F 11/38* (2018.01); *F24F 11/52* (2018.01); *F24F 11/64* (2018.01); *F24F 2110/12* (2018.01); *F24F 2130/10* (2018.01)

(58) Field of Classification Search
CPC .. F24F 11/38; F24F 11/52; F24F 11/64; F24F 2110/12; F24F 2130/10; F24F 11/58;
(Continued)

(56) References Cited

U.S. PATENT DOCUMENTS

2008/0033674 A1* 2/2008 Nikovski ................. F24F 11/62
                                                              702/108
2012/0232877 A1* 9/2012 Bhagwat ............ H05K 7/20836
                                                              703/13
(Continued)

FOREIGN PATENT DOCUMENTS

CN     201503104 U  *  6/2010
EP       2866117 A1 *  4/2015  ........... G05B 13/025
(Continued)

OTHER PUBLICATIONS

International Search Report with Written Opinion and English translations dated Nov. 12, 2021; International Appln. No. PCT/KR2021/009677.

*Primary Examiner* — Alicia M. Choi
(74) *Attorney, Agent, or Firm* — Jefferson IP Law, LLP

(57) ABSTRACT

An electronic apparatus is provided. The electronic apparatus includes a communication interface, a memory, and a processor. The processor according to the disclosure is configured to acquire weather information and information on a space where an air conditioner is installed, train a neural network model based on the weather information and the information on the space, based on acquiring driving information of the air conditioner and a measured temperature of the space through the communication interface, input the measured temperature of the space and the external tem-
(Continued)

perature into the neural network model and acquire predicted temperature information per time for the space, determine whether a defect exists in the air conditioner based on the predicted temperature information and the measured temperature of the space, and based on determining that a defect exists in the air conditioner, generate a notification signal.

15 Claims, 14 Drawing Sheets

(51) Int. Cl.
*F24F 11/64* (2018.01)
*F24F 110/12* (2018.01)
*F24F 130/10* (2018.01)

(58) Field of Classification Search
CPC .... F24F 2140/60; F24F 2110/10; F24F 11/56; F24F 11/63; F24F 2140/00; F24F 11/30; F24F 11/47; G06N 3/02
See application file for complete search history.

(56) References Cited

U.S. PATENT DOCUMENTS

| | | | |
|---|---|---|---|
| 2013/0297240 A1 | 11/2013 | Dutton et al. | |
| 2016/0054019 A1* | 2/2016 | Lee | F24F 11/88 700/276 |
| 2016/0201933 A1* | 7/2016 | Hester | F24F 11/48 700/276 |
| 2017/0038279 A1* | 2/2017 | Dasgupta | G06Q 10/06 |
| 2017/0083346 A1* | 3/2017 | Frankland | H04L 65/1069 |
| 2018/0204111 A1* | 7/2018 | Zadeh | G06V 10/764 |
| 2019/0234638 A1* | 8/2019 | Song | F24F 11/62 |
| 2019/0264936 A1* | 8/2019 | Bailey | G05B 15/02 |
| 2019/0271483 A1 | 9/2019 | Joo et al. | |
| 2019/0360711 A1* | 11/2019 | Sohn | G05B 15/02 |
| 2019/0376713 A1 | 12/2019 | Yoshimoto et al. | |
| 2020/0041160 A1 | 2/2020 | Ko et al. | |
| 2020/0200416 A1* | 6/2020 | Granger | G16H 40/67 |
| 2021/0190362 A1 | 6/2021 | Ko et al. | |
| 2021/0239347 A1* | 8/2021 | Wiens-Kind | G06Q 10/04 |
| 2021/0356161 A1* | 11/2021 | Chen | G05B 19/042 |
| 2021/0389011 A1* | 12/2021 | Wu | F24F 11/64 |
| 2023/0123181 A1* | 4/2023 | Shimokawa | F24F 11/63 700/276 |

FOREIGN PATENT DOCUMENTS

| | | | | |
|---|---|---|---|---|
| JP | H09-033089 A | | 2/1997 | |
| JP | 2003-161495 A | | 6/2003 | |
| JP | 2012-141110 A | | 7/2012 | |
| JP | 5945820 B2 | | 7/2016 | |
| JP | 5960841 B2 | | 8/2016 | |
| JP | 2019-216522 A | | 12/2019 | |
| KR | 10-1259803 B1 | | 4/2013 | |
| KR | 10-2016-0103646 A | | 9/2016 | |
| KR | 10-1908311 B1 | | 10/2018 | |
| KR | 101908311 B1 | * | 10/2018 | ............ F24F 11/00 |
| KR | 10-2019-0096311 A | | 8/2019 | |
| KR | 10-2019-0104926 A | | 9/2019 | |
| KR | 20210063970 A | * | 11/2019 | ............ F24F 11/63 |
| KR | 10-2019-0140810 A | | 12/2019 | |
| WO | WO-2013043863 A1 | * | 3/2013 | ............ G05B 15/02 |

\* cited by examiner

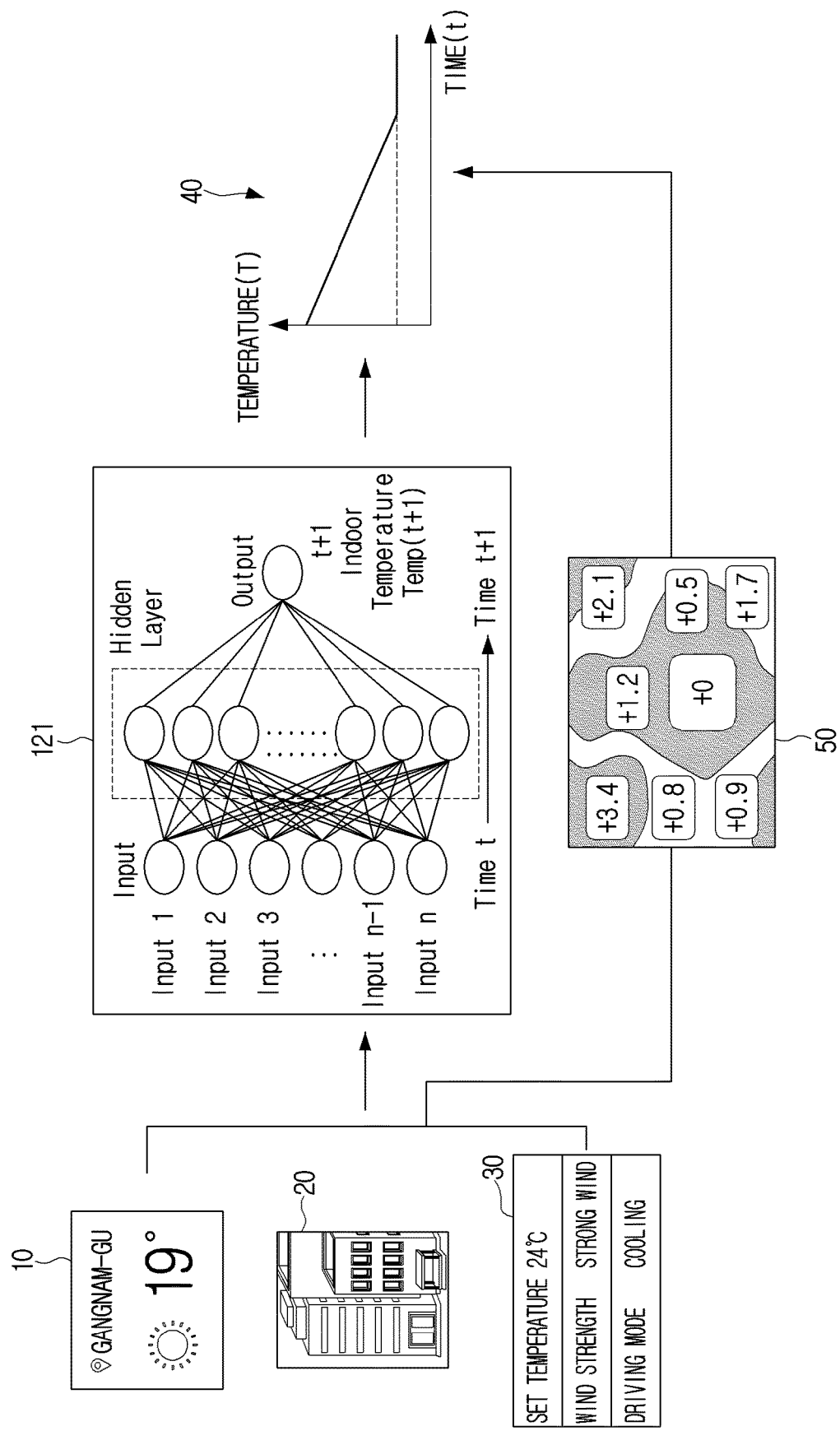

ELECTRONIC APPARATUS AND METHOD TO TRAIN NEURAL NETWORK TO DETERMINE DEFECTIVE AIR CONDITIONER

CROSS-REFERENCE TO RELATED APPLICATION(S)

This application is a U.S. National Stage application under 35 U.S.C. § 371 of an International application number PCT/KR2021/009677, filed on Jul. 27, 2021, which is based on and claims priority of a Korean patent application number 10-2020-0104395, filed on Aug. 20, 2020, in the Korean Intellectual Property Office, the disclosure of which is incorporated by reference herein in its entirety.

TECHNICAL FIELD

The disclosure relates to an electronic apparatus and a method for controlling thereof, and more particularly, to an electronic apparatus that determines whether a defect exists in an air conditioner by using a neural network model, and a method for controlling thereof.

BACKGROUND ART

Currently, spurred by the development of electronic technologies, a research on a so-called smart building system which smartly manages various apparatuses such as an air conditioner, a heater, etc., installed in a building is actively going on.

The above information is presented as background information only to assist with an understanding of the disclosure. No determination has been made, and no assertion is made, as to whether any of the above might be applicable as prior art with regard to the disclosure.

DISCLOSURE

Technical Problem

Meanwhile, a smart building system of the related art determined whether a defect existed in an air conditioner installed in a building based on random rules that were not in consideration of the current weather information, the characteristics of the region wherein the building was located, or the characteristics of the building itself. Accordingly, there was a problem that accuracy for determination of whether a defect existed in an air conditioner was reduced, and inconvenience was caused to a user.

Thus, there is a rising need for a technology for determining a defect of an air conditioner installed in a building accurately.

Aspects of the disclosure are to address at least the above-mentioned problems and/or disadvantages and to provide at least the advantages described below. Accordingly, an aspect of the disclosure is to provide an electronic apparatus that determines a defect of an air conditioner installed in a building.

Meanwhile, the technical tasks of the disclosure are not limited to the technical tasks mentioned above, and other technical tasks that were not mentioned would be clearly understood by a person having ordinary knowledge in the technical field to which the disclosure belongs from the following description.

Additional aspects will be set forth in part in the description which follows and, in part, will be apparent from the description, or may be learned by practice of the presented embodiments.

Technical Solution

In accordance with an aspect of the disclosure, an electronic apparatus for resolving the aforementioned technical task is provided. The electronic apparatus controlling an air conditioner includes a communication interface, a memory storing at least one instruction, and a processor, wherein the processor is configured to acquire weather information including an external temperature of a region wherein the air conditioner is installed and information on the space including the temperature of the space where the air conditioner is installed, train a neural network model based on the weather information and the information on the space, based on acquiring driving information of the air conditioner including a set temperature and a measured temperature of the space through the communication interface, input the measured temperature of the space and the external temperature into the neural network model and acquire predicted temperature information per time for the space, determine whether a defect exists in the air conditioner based on the predicted temperature information and the measured temperature of the space, and based on determining that a defect exists in the air conditioner, generate a notification signal may be provided.

The processor may acquire a predicted time point when the temperature of the space reaches the set temperature based on the predicted temperature information and the set temperature, and based on the measured temperature of the space not reaching the set temperature within a predetermined time range from the predicted time point, determine that a defect exists in the air conditioner The processor may acquire a predicted time point when the temperature of the space reaches the set temperature based on the predicted temperature information and the set temperature, and based on a difference between the measured temperature of the space and the set temperature being greater than or equal to a predetermined value at the predicted time point, determine that a defect exists in the air conditioner.

The processor may acquire a prestored neural network model trained to acquire predicted temperature information per time for the space based on the temperature of the space and the external temperature in the memory, and train the neural network model by updating a parameter of the prestored neural network model based on the weather information, the information on the space, and information on the use pattern.

The processor may acquire a heat characteristic for the space based on the measured temperature of the space and the external temperature, and correct the predicted temperature information based on the heat characteristic.

The processor may when determining that a defect does not exist in the air conditioner, retrain the neural network model based on the temperature of the space, the external temperature, and the predicted temperature information.

The information on the space may comprise at least one of the use and the size of the space, the location of the air conditioner inside the space, the number of windows present in the space, the sizes of the windows, or whether the windows are opened and closed.

The driving information may comprise at least one of a set temperature, a wind volume, or a driving mode.

The processor may control the communication interface to transmit the notification signal for providing a notification message to a user terminal.

The processor may acquire information on a use pattern of the air conditioner, and train the neural network model based on the information on the use pattern of the air conditioner.

In accordance with another aspect of the disclosure, a method for resolving the aforementioned technical task is provided. The method for controlling an electronic apparatus controlling an air conditioner includes the steps of acquiring weather information including an external temperature of a region wherein the air conditioner is installed and information on the space including the temperature of the space where the air conditioner is installed, training a neural network model based on the weather information and the information on the space, based on acquiring driving information of the air conditioner including a set temperature and a measured temperature of the space through the communication interface, inputting the measured temperature of the space and the external temperature into the neural network model and acquiring predicted temperature information per time for the space, determining whether a defect exists in the air conditioner based on the predicted temperature information and the measured temperature of the space, and based on determining that a defect exists in the air conditioner, generating a notification signal may be provided.

The determining may comprise acquiring a predicted time point when the temperature of the space reaches the set temperature based on the predicted temperature information and the set temperature, and based on the measured temperature of the space not reaching the set temperature within a predetermined time range from the predicted time point, determining that a defect exists in the air conditioner.

The determining may comprise acquiring a predicted time point when the temperature of the space reaches the set temperature based on the predicted temperature information and the set temperature, and based on a difference between the measured temperature of the space and the set temperature being greater than or equal to a predetermined value at the predicted time point, determining that a defect exists in the air conditioner The training a neural network model may comprise acquiring a prestored neural network model trained to acquire predicted temperature information per time for the space based on the temperature of the space and the external temperature in the memory, and training the neural network model by updating a parameter of the prestored neural network model based on the weather information, the information on the space, and information on the use pattern.

The acquiring predicted temperature information may comprise acquiring a heat characteristic for the space based on the measured temperature of the space and the external temperature, and correcting the predicted temperature information based on the heat characteristic Meanwhile, means for resolving the task of the disclosure is not limited to the aforementioned resolution means, and resolution means that were not mentioned would be clearly understood by a person having ordinary knowledge in the technical field to which the disclosure belongs from this specification and the accompanying drawings.

Advantageous Effects

According to the various embodiments of the disclosure as described above, an electronic apparatus can determine whether a defect exists in an air conditioner by using a trained neural network model. Accordingly, satisfaction and convenience of a user can be improved.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 1A is a diagram for illustrating a concept of a method for determining a defect of an air conditioner according to an embodiment of the disclosure;

Throughout the drawings, it should be noted that like reference numbers are used to depict the same or similar elements, features, and structures.

BEST MODE

Figure 1B:
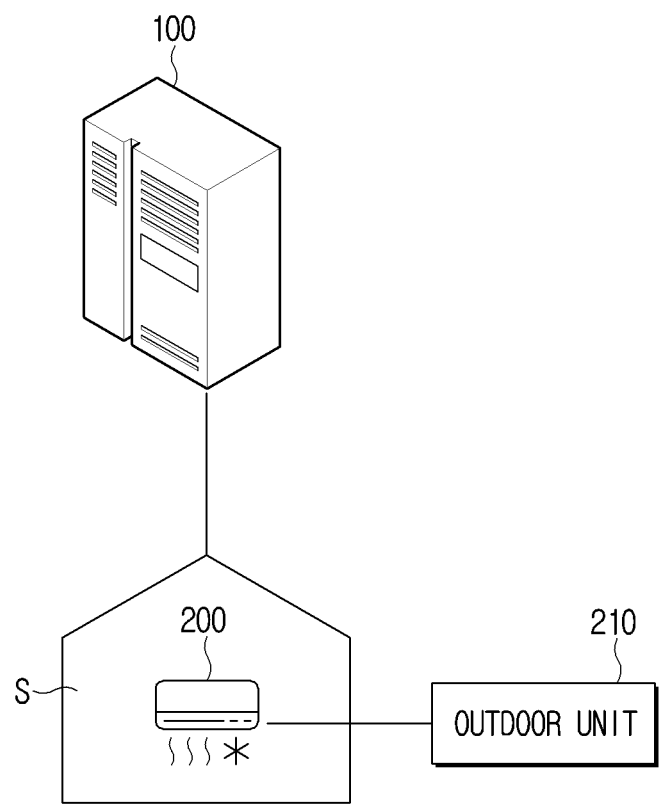
FIG. 1B is a diagram that schematized an air conditioner and an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives included in the ideas and the technical scopes disclosed herein. Further, in describing the embodiments, in case it is determined that detailed explanation of related known technologies may confuse the gist of the disclosure, the detailed explanation will be omitted.

In addition, terms such as 'the first,' 'the second,' and the like may be used to describe various components, but these components are not to be limited by the terms. The terms are used only for the purpose of distinguishing one component from another component.

Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1A is a diagram for illustrating a concept of a method for determining a defect of an air conditioner according to an embodiment of the disclosure.

FIG. 1B is a diagram that schematized an air conditioner and an electronic apparatus according to an embodiment of the disclosure.

Referring to FIG. 1A, an electronic apparatus 100 in FIG. 1B may acquire weather information 10 for a region wherein an air conditioner is installed, information on the space where an air conditioner is installed in space 20, and information on a use pattern 30 of the air conditioner.

The weather information 10 may include at least one of an external temperature, humidity, precipitation, rainfall probability, a wind volume, or a climate pattern per time of the region wherein the air conditioner is installed. The electronic apparatus 100 may acquire the weather information 10 from an external server (e.g., the server of the weather center).

Alternatively, referring to FIG. 1B, the electronic apparatus 100 may acquire the weather information 10 from an outdoor unit 210 provided in the space S wherein the air conditioner 200 is installed. The outdoor unit 210 may acquire the external temperature outside the space S wherein the air conditioner is installed by using a temperature sensor. The outdoor unit 210 may transmit the external temperature to the electronic apparatus 100 by a predetermined time interval (e.g., one minute).

The information on the space 20 may include the temperature of the space S wherein the air conditioner 200 is installed. The air conditioner 200 may acquire the internal temperature of the space S by using the temperature sensor, and transmit the acquired temperature to the electronic apparatus 100 by the predetermined time interval. Also, the information on the space 20 may include at least one of the use of the space S wherein the air conditioner is installed (e.g., whether the space is an office or a restaurant), the location (e.g., in case the space S exists in a building including a plurality of floors, on which floor of the building the space S exists), the size, the location of the air conditioner 200 inside the space S, the number of windows present in the space S, the sizes of the windows and whether the windows are opened and closed, the degree of decrepitude of the space S, or the number of occupants of the space S. Meanwhile, the information on the space 20 may be acquired from the air conditioner 200 or input by a user and stored in the electronic apparatus 100.

The information on the use pattern 30 means information on how a user uses the air conditioner 200 in a specific situation. For example, the information on the use pattern 30 may include driving information for the air conditioner 200 set by a user when each of the external temperature and the internal temperature of the space S is a specific temperature. The driving information may include at least one of a set temperature (or a target temperature), the strength of the wind, or the driving mode.

The electronic apparatus 100 may acquire temperature information per time of the space S corresponding to the weather information 10, the information on the space 20, and the information on the use pattern 30. For example, when the air conditioner 200 was operated in a situation wherein the external temperature is 34 degrees, the temperature of the space S is 30 degrees, and the set temperature set by the user is 26 degrees, the electronic apparatus 100 may acquire the temperature information of the space S per time. The temperature information of the space S per time may be acquired through the temperature sensor provided in the air conditioner 200, and transmitted from the air conditioner 200 to the electronic apparatus 100.

The electronic apparatus 100 may match the weather information 10, the information on the space 20, the information on the use pattern 30, and the temperature information of the space S per time according to the operation of the air conditioner 200 and store them. For example, the electronic apparatus 100 may match the weather information 10, the information on the space 20, the information on the use pattern 30, and the temperature information of the space S per time during a week and store them.

The electronic apparatus 100 may train a neural network model 121 to acquire predicted temperature information 40 per time based on at least one of the weather information 10, the information on the space 20, the information on the use pattern 30, or the temperature information of the space S per time according to the operation of the air conditioner 200 stored. For example, the electronic apparatus 100 may input the weather information 10, the information on the space 20, and the information on the use pattern 30 into the neural network model 121 and acquire the predicted temperature information per time. The neural network model 121 may be trained in advance to acquire the temperature information per time based on the prestored information and stored in the electronic apparatus 100. The electronic apparatus 100 may calculate an error value by comparing the predicted temperature information per time acquired through the neural network model 121 and the prestored temperature information per time, and update a parameter (or a weighted value) of the neural network model 121 so that the error value is minimized. As described above, the electronic apparatus 100 may train the neural network model 121 based on the weather information 10, the information on the space 20, and the information on the use pattern 30.

When the neural network model 121 is trained, the electronic apparatus 100 may determine whether a defect exists in the air conditioner 200 by using the trained neural network model 121. Specifically, if information on a user's command for operating the air conditioner 200 is acquired, the electronic apparatus 100 may acquire the weather information 10, the information on the space 20, and the information on the use pattern 30 corresponding to the current time point (or, the time point when the user command was acquired). Then, the electronic apparatus 100 may input at least one of the weather information 10, the information on the space 20, or the information on the use pattern 30 into the neural network model 121 and acquire the predicted temperature information 40 per time. Also, the electronic apparatus 100 may acquire the measured temperature of the space S per time. The electronic apparatus 100 may determine whether a defect exists in the air conditioner 200 based on the predicted temperature information 40 and the measured temperature of the space S.

As an example, the electronic apparatus 100 may acquire a predicted time point when the temperature of the space S reaches the set temperature based on the predicted temperature information 40 and the set temperature. If the measured temperature of the space S does not reach the set temperature within a predetermined time range from the predicted time point, the electronic apparatus 100 may determine that a defect exists in the air conditioner 200. As another example, the electronic apparatus 100 may acquire a predicted time point when the temperature of the space reaches the set temperature based on the predicted temperature information 40 and the set temperature, and if a difference between the measured temperature of the space and the set temperature is greater than or equal to a predetermined value at the predicted time point, the electronic apparatus 100 may determine that a defect exists in the air conditioner 200. In contrast, if it is determined that a defect does not exist in the air conditioner 200, the electronic apparatus 100 may retrain the neural network model 121 based on the temperature of the space S, the external temperature, and the predicted temperature information 40.

Meanwhile, if it is determined that a defect exists in the air conditioner 200, the electronic apparatus 100 may generate a notification signal. Then, the electronic apparatus 100 may transmit a control signal for controlling a user terminal to output a message corresponding to the notification signal to the user terminal. Accordingly, the user may recognize that a defect exists in the air conditioner 200.

Meanwhile, the electronic apparatus 100 may correct the predicted temperature information 40 per time based on a heat characteristic 50 for the space where the air conditioner 200 is installed. The heat characteristic 50 means temperature distribution for the space S wherein the air conditioner 200 is installed. The heat characteristic 50 may include temperature information for areas respectively corresponding to the locations of a plurality of air conditioners 200 installed in the space S. As illustrated in FIG. 1A, the heat characteristic 50 may include a difference value between the temperature of a specific location and the temperature of the location wherein the air conditioner 200 is installed.

The electronic apparatus 100 may acquire the heat characteristic 50 for the space where the air conditioner 200 is installed based on the weather information 10, the information on the space 20, and the information on the use pattern 30. Specifically, the electronic apparatus 100 may acquire the heat characteristic 50 by using a predefined function including the weather information 10, the information on the space 20, and the information on the use pattern 30 as input factors.

Meanwhile, in FIG. 1A, it is illustrated that the electronic apparatus 100 acquires the heat characteristic 50 separately from the predicted temperature information 40 per time. However, this is merely an embodiment, and the electronic apparatus 100 may input the weather information 10, the information on the space 20, and the information on the use pattern 30 into the neural network model 121 and acquire the predicted temperature information 40 per time reflecting the heat characteristic 50. That is, the neural network model 121 may be trained to infer the predicted temperature information 40 per time in consideration of the heat characteristic 50.

Figure 2:
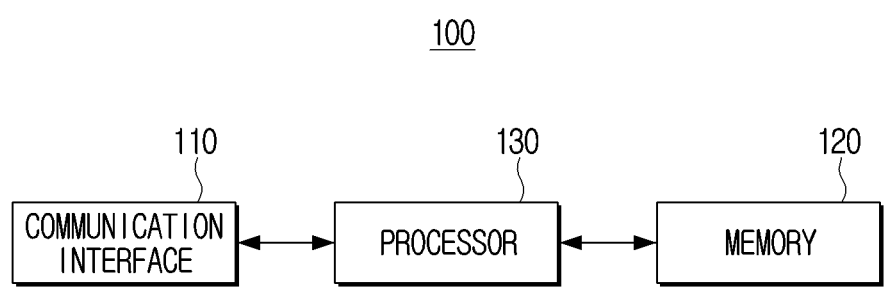
FIG. 2 is a block diagram illustrating the components of an electronic apparatus according to an embodiment of the disclosure.

FIG. 2 is a block diagram illustrating the components of the electronic apparatus 100 according to an embodiment of the disclosure. The electronic apparatus 100 may include a communication interface 110, a memory 120, and a processor 130. Meanwhile, the electronic apparatus 100 may be implemented as a server apparatus managing the air conditioner 200. Hereinafter, each component of the electronic apparatus 100 will be described.

Referring to FIG. 2, the communication interface 110 may include at least one circuit, and perform communication with various types of external devices according to various types of communication methods. As an example, the communication interface 110 may perform communication with the air conditioner 200 and a user device 300. The communication interface 110 may perform communication with the air conditioner 200 by a first communication method (e.g., a wired method), and perform communication with the user device 300 by a second communication method (e.g., a wireless method). The user device 300 may include a user terminal like a mobile device, a personal computer (PC), etc.

In case the communication interface 110 performs communication with the air conditioner 200 or the user device 300 by a wireless communication method, the communication interface 110 may include at least one of a Bluetooth module, a Wi-Fi communication module, a cellular communication module, a 3rd generation (3G) mobile communication module, a 4th generation (4G) mobile communication module, or a 4th generation long term evolution (LTE) communication module. Also, the communication interface 110 may perform communication with the air conditioner 200 by a wired communication method (e.g., a LAN) for reinforcing security.

The memory 120 may store an operating system (OS) for controlling the overall operations of the components of the electronic apparatus 100 and instructions or data related to the components of the electronic apparatus 100. For example, the memory 120 may store the weather information 10, the information on the space 20, the information on the use pattern 30, and the temperature information of the space S per time according to the operation of the air conditioner 200 in FIG. 1A. Also, the memory 120 may store the neural network model 121 to acquire the predicted temperature information per time.

Meanwhile, the memory 120 may be implemented as a non-volatile memory (ex: a hard disc, a solid state drive (SSD), a flash memory), a volatile memory, etc. In particular, the neural network model may be executed by a generic-purpose processor (e.g., a CPU) of the related art or a separate AI-dedicated processor (e.g., a GPU, an NPU, etc.).

The processor 130 may control the overall operations of the electronic apparatus 100.

The processor 130 may acquire the weather information 10, the information on the space 20, and the information on the use pattern 30. For example, the processor 130 may acquire the temperature of the space where the air conditioner 200 is installed through the communication interface 110. Also, the processor 130 may acquire the driving information of the air conditioner 200 including the set temperature through the communication interface 110.

The processor 130 may acquire a pre-trained neural network model stored in the memory 120. Then, the processor 130 may train the neural network model based on the weather information 10, the information on the space 20, and the information on the use pattern 30. When training is completed, the processor 130 may store the trained neural network model in the memory 120.

When the driving information of the air conditioner 200 and the measured temperature of the space S are acquired through the communication interface 110, the processor 130 may input the measured temperature of the space S and the external temperature into the trained neural network model, and acquire the predicted temperature information 40 per time for the space S.

The processor 130 may determine whether a defect exists in the air conditioner 200 based on the predicted temperature information 40 and the measured temperature of the space S. If it is determined that a defect exists in the air conditioner 200, the processor 130 may control the communication interface 110 to transmit a control signal for displaying a notification message to the user device 300.

Meanwhile, functions related to artificial intelligence according to the disclosure are operated through the processor 130 and the memory 120. The processor 130 may consist of one or a plurality of processors. The one or plurality of processors may be generic-purpose processors such as a CPU, an AP, a digital signal processor (DSP), etc., graphics-dedicated processors such as a GPU and a vision processing unit (VPU), or artificial intelligence-dedicated processors such as an NPU. The one or plurality of processors perform control such that input data is processed according to pre-defined operation rules or an artificial intelligence model stored in the memory 120. Alternatively, in case the one or plurality of processors are artificial intelligence-dedicated processors, the artificial intelligence-dedicated processors may be designed as a hardware structure specified for processing of a specific artificial intelligence model.

The predefined operation rules or the artificial intelligence model are characterized in that they are made through learning. Being made through learning means that a basic artificial intelligence model is trained by using a plurality of learning data by a learning algorithm, and predefined operation rules or an artificial intelligence model set to perform a desired characteristic (or, purpose) are thereby made. Such learning may be performed in an apparatus itself wherein artificial intelligence according to the disclosure is performed, or performed through a separate server/system. As examples of learning algorithms, there are supervised learning, unsupervised learning, semi-supervised learning, or reinforcement learning, but learning algorithms in the disclosure are not limited to the aforementioned examples.

An artificial intelligence model may be made through learning. Being made through learning means that a basic artificial intelligence model is trained by using a plurality of learning data by a learning algorithm, and predefined operation rules or an artificial intelligence model set to perform a desired characteristic (or, purpose) are thereby made. An artificial intelligence model may consist of a plurality of neural network layers. Each of the plurality of neural network layers has a plurality of weight values, and performs a neural network operation through an operation between the operation result of the previous layer and the plurality of weight values. The plurality of weight values included by the plurality of neural network layers may be optimized by the learning result of the artificial intelligence model. For example, the plurality of weight values may be updated such that a loss value or a cost value acquired at the artificial intelligence model during a learning process is reduced or minimized.

The electronic apparatus 100 according to the disclosure may use an artificial intelligence model to infer or predict the temperature per time for the space. The processor 130 may perform a pre-processing process for the weather information 10, the information on the space 20, and the information on the use pattern 30, and convert the information into a form appropriate for being used as an input for an artificial intelligence model. An artificial intelligence model may be made through learning. Being made through learning means that a basic artificial intelligence model is trained by using a plurality of learning data by a learning algorithm, and predefined operation rules or an artificial intelligence model set to perform a desired characteristic (or, purpose) are thereby made. An artificial intelligence model may consist of a plurality of neural network layers. Each of the plurality of neural network layers has a plurality of weight values, and performs a neural network operation through an operation between the operation result of the previous layer and the plurality of weight values.

Inference/prediction refers to a technology of determining information and then making logical inference and prediction, and includes knowledge/probability-based reasoning, optimization prediction, preference-based planning, recommendation, and the like.

An artificial neural network may include a deep neural network (DNN). As examples of a neural network, there are a convolutional neural network (CNN), a deep neural network (DNN), a recurrent neural network (RNN), a generative adversarial network (GAN), a restricted Boltzmann machine (RBM), a deep belief network (DBN), a bidirectional recurrent deep neural network (BRDNN), or deep Q-networks, but the neural network in the disclosure is not limited to the aforementioned examples.

Figure 3A:
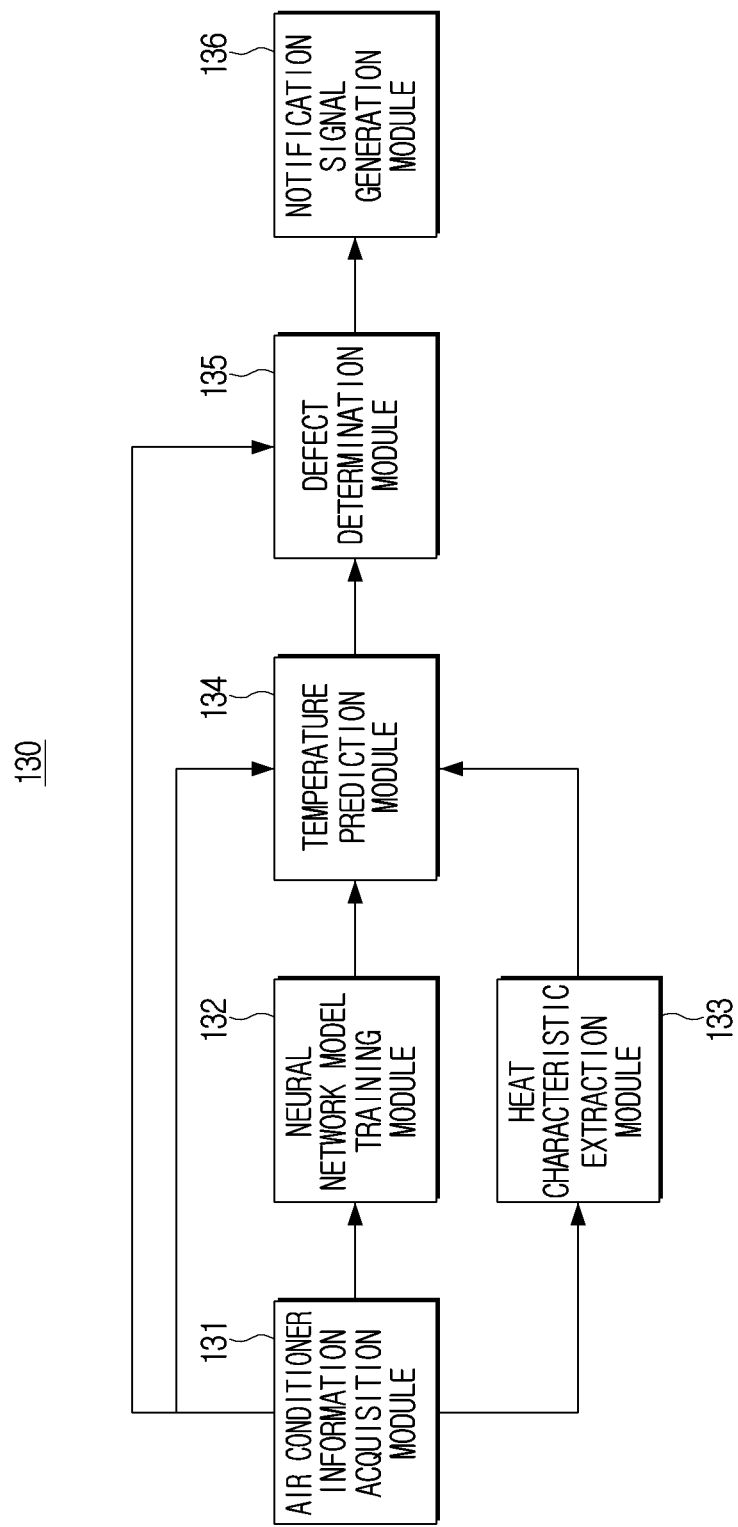
FIG. 3A is a block diagram illustrating a configuration of a processor according to an embodiment of the disclosure.

FIG. 3A is a block diagram illustrating a configuration of a processor according to an embodiment of the disclosure.

Referring to FIG. 3A, the processor 130 may include an air conditioner information acquisition module 131, a neural network model training module 132, a heat characteristic extraction module 133, a temperature prediction module 134, a defect determination module 135, and a notification signal generation module 136.

The air conditioner information acquisition module 131 may acquire the weather information 10 including the external temperature of the region wherein the air conditioner is installed, the information on the space 20 including the temperature of the space where the air conditioner is installed, and the information on the use pattern 30 of the air conditioner.

The neural network model training module 132 may train a neural network model to acquire the predicted temperature per time for the space where the air conditioner is installed based on the weather information 10, the information on the space 20, and the information on the use pattern 30. Specifically, the neural network model training module 132 may acquire a pre-trained neural network model stored in the memory 120. The parameter of the pre-trained neural network model may be set in advance by a user. The neural network model training module 132 may update the parameter of the pre-trained neural network model based on the weather information 10, the information on the space 20, and the information on the use pattern 30 and acquire a new neural network model. The accuracy of the predicted temperature information per time acquired through a new neural network model acquired as above may be higher than the accuracy of the predicted temperature information per time acquired through the pre-trained neural network model.

The heat characteristic extraction module 133 may acquire the heat characteristic 50 for the space where the air conditioner 200 is installed based on the weather information 10, the information on the space 20, and the information on the use pattern 30. The heat characteristic extraction module 133 may acquire the heat characteristic 50 by using a predefined function including the weather information 10, the information on the space 20, and the information on the use pattern 30 as input factors.

The temperature prediction module 134 may acquire the predicted temperature information 40 per time for the space where the air conditioner 200 is installed based on the weather information 10, the information on the space 20, the information on the use pattern 30, and the heat characteristic 50. The temperature prediction module 134 may input the weather information 10, the information on the space 20, and the information on the use pattern 30 into the neural network model 121 acquired through the neural network model training module 132 and acquire the predicted temperature information 40. Then, the temperature prediction module 134 may correct the acquired predicted temperature information 40 based on the heat characteristic 50.

The defect determination module 135 may determine whether a defect exists in the air conditioner 200 based on the predicted temperature information 40. As an example, the defect determination module 135 may acquire a predicted time point when the temperature of the space S wherein the air conditioner 200 is installed reaches the set temperature based on the predicted temperature information 40 and the set temperature set by the user for the air conditioner 200. If the measured temperature of the space S does not reach the set temperature within the predetermined time range from the predicted time point, the defect determination module 135 may determine that a defect exists in the air conditioner 200. As another example, the defect determination module 135 may acquire a predicted time point when the temperature of the space reaches the set temperature based on the predicted temperature information 40 and the set temperature, and if a difference between the measured temperature of the space and the set temperature is greater than or equal to the predetermined value at the predicted time point, the defect determination module 135 may determine that a defect exists in the air conditioner 200. Meanwhile, the method for determining whether a defect exists in the air conditioner 200 will be described in more detail below with reference to FIGS. 4A and 4B.

If it is determined that a defect exists in the air conditioner 200 through the defect determination module 135, the notification signal generation module 136 may generate a notification signal for notifying the defect of the air conditioner 200 to the user. The notification signal generation module 136 may control the communication interface 110 to transmit a notification signal for providing a notification message (e.g., a pop-up message) to the user terminal.

Meanwhile, in the above description, it is described that the electronic apparatus 100 determines whether a defect exists in the air conditioner 200 based on the predicted temperature information 40, but the electronic apparatus 100 may also determine whether a defect exists in the air conditioner 200 based on a predicted amount of power consumption of the air conditioner 200. For this, the processor 130 may include a power amount prediction module 137.

Figure 3B:
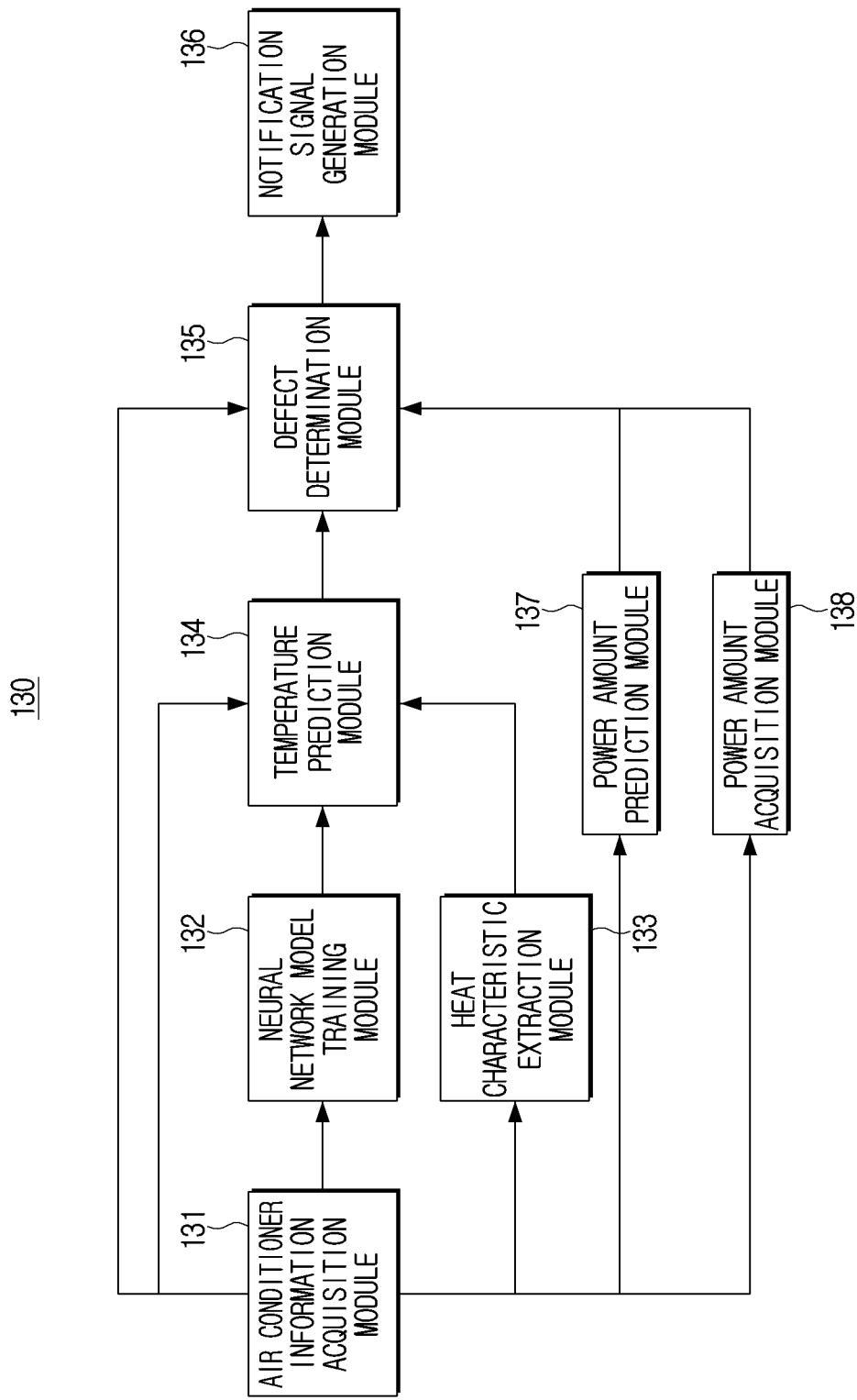
FIG. 3B is a block diagram illustrating a configuration of a processor according to an embodiment of the disclosure.

FIG. 3B is a block diagram illustrating a configuration of a processor according to an embodiment of the disclosure. As in the embodiment of FIG. 3A, the processor 130 may include an air conditioner information acquisition module 131, a neural network model training module 132, a heat characteristic extraction module 133, a temperature prediction module 134, a defect determination module 135, and a notification signal generation module 136, and for the convenience of explanation, explanation overlapping with FIG. 3A will be omitted.

Referring to FIG. 3B, according to an embodiment of the disclosure, the processor 130 may include a power amount prediction module 137 and a power amount acquisition module 138. The power amount prediction module 137 may acquire the predicted power amount per time consumed by the air conditioner 200 by using a power amount prediction model. The power amount prediction model is an artificial intelligence model, and it may be trained to acquire the predicted power amount per time consumed by the air conditioner 200 based on the weather information 10, the information on the space 20, and the information on the use pattern 30. For example, the power amount prediction module 137 may input the current external temperature, the current temperature of the space S, and the temperature set by the user into the power amount prediction model, and acquire a predicted power amount. Meanwhile, the power amount prediction model may be trained based on the weather information 10, the information on the space 20, the information on the use pattern 30, and the amount of power consumption of the air conditioner 200 that were acquired through the past driving and stored in the memory 120.

The power amount acquisition module 138 may acquire the measured power amount per time that is actually consumed according to the operation of the air conditioner 200. The power amount acquisition module 138 may acquire the measured power amount by various methods. As an example, the power amount acquisition module 138 may acquire the measured power amount through an electricity meter that calculates the amount of power consumption of the air conditioner 200. As another example, the power amount acquisition module 138 may acquire the measured power amount per time based on the operating capacity of the air conditioner 200 and the compressor current frequency of the outdoor unit 210 electronically connected with the air conditioner 200. Specifically, the power amount acquisition module 138 may calculate the measured power amount based on Formula 1 below.

$$\text{Measured power amount} = \frac{\text{capacity}_n \times \text{frequency}_n}{\sum_1^{24}(\text{capacity}_n \times \text{frequency}_n)} \times 100 \quad \text{Formula 1}$$

In Formula 1, $\text{capacity}_n$ is the operating capacity of the air conditioner 200 per time, and $\text{frequency}_n$ is the compressor current frequency of the outdoor unit 210 per time.

The defect determination module 135 may determine whether a defect exists in the air conditioner 200 based on the predicted power amount and the measured power amount. For example, if a difference between the predicted power amount and the measured power amount is greater than or equal to a predetermined value, the power amount prediction module 137 may determine that a defect exists in the air conditioner 200. The predetermined value may be set and changed by a user.

Meanwhile, in FIGS. 3A and 3B, the plurality of modules 131 to 138 are described as components of the processor 130. However, this is merely an embodiment, and the plurality of modules 131 to 138 may be stored in the memory 120. The processor 130 may load the plurality of modules 131 to 138 stored in the memory 120 from a non-volatile memory to a volatile memory, and execute each function of the plurality of modules 131 to 138. Also, each module of the processor 130 may be implemented as software, or implemented in a form wherein software and hardware are combined.

Figure 4A:
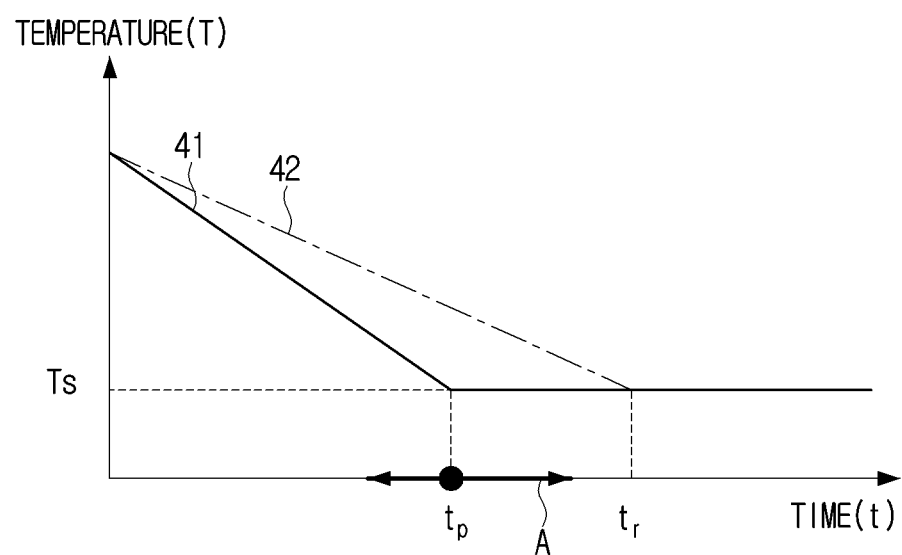
FIG. 4A is a graph for illustrating a method for determining a defect of an air conditioner according to an embodiment of the disclosure.

FIG. 4A is a graph for illustrating a method for determining a defect of an air conditioner according to an embodiment of the disclosure.

Referring to FIG. 4A, a graph of a predicted temperature and the measured temperature per time for the space S wherein the air conditioner is installed is illustrated. The predicted temperature 41 may correspond to the predicted temperature information 40 in FIG. 1A.

The electronic apparatus 100 may determine whether a defect exists in the air conditioner 200 based on the predicted temperature 41, the measured temperature 42, and the set temperature (Ts). As an example, the electronic apparatus 100 may acquire a predicted time point $t_p$ when the temperature of the space S reaches the set temperature Ts based on the predicted temperature 41 and the set temperature Ts. If the measured temperature 42 does not reach the set temperature Ts within a predetermined time range A from the predicted time point $t_p$, the electronic apparatus 100 may determine that a defect exists in the air conditioner 200.

For example, as illustrated in FIG. 4A, if the actual time point $t_r$ when the measured temperature 42 reaches the set temperature Ts is not included within the predetermined time range A from the predicted time point $t_p$, the electronic apparatus 100 may determine that a defect exists in the air conditioner 200. Meanwhile, the predetermined time range A may be set and changed by the user. Also, if a difference between the actual time point $t_r$ and the predicted time point $t_p$ is greater than a predetermined value, the electronic apparatus 100 may determine that a defect exists in the air conditioner 200.

As another example, the electronic apparatus 100 may determine whether a defect exists in the air conditioner 200 by comparing the measured temperature 42 and the set temperature Ts of the space S at the predicted time point $t_p$. If the measured temperature 42 of the space S at the predicted time point $t_p$ is not included within a predetermined time range B from the set temperature Ts, the electronic apparatus 100 may determine that a defect exists in the air conditioner 200.

Figure 4B:
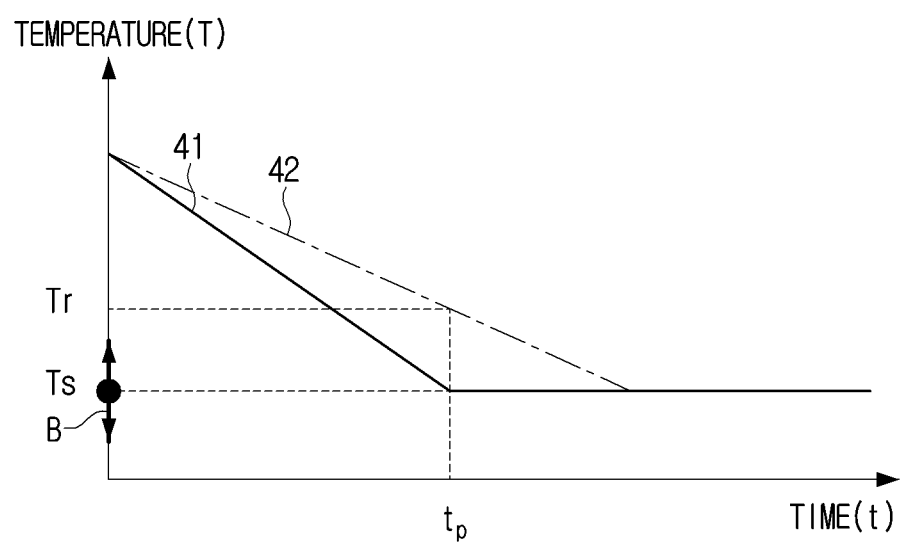
FIG. 4B is a graph for illustrating a method for determining a defect of an air conditioner according to an embodiment of the disclosure.

FIG. 4B is a graph for illustrating a method for determining a defect of an air conditioner according to an embodiment of the disclosure.

Referring to FIG. 4B, if the measured temperature Tr at the predicted time point $t_p$ is not included within the predetermined time range B from the set temperature Ts, the electronic apparatus 100 may determine that a defect exists in the air conditioner 200. Meanwhile, the predetermined time range B may be set and changed by the user. Also, if a difference between the measured temperature Tr and the set temperature Ts is greater than a predetermined value, the electronic apparatus 100 may determine that a defect exists in the air conditioner 200.

Figure 5:
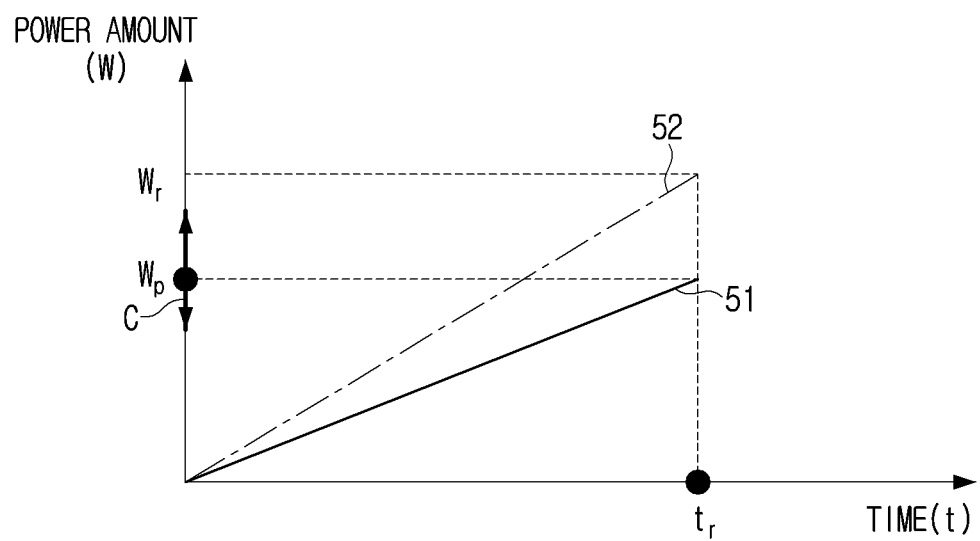
FIG. 5 is a graph for illustrating a method for determining a defect of an air conditioner according to an embodiment of the disclosure.

FIG. 5 is a graph for illustrating a method for determining a defect of an air conditioner according to an embodiment of the disclosure. Also, FIG. 5 is a graph that illustrated the predicted power amount 51 and the measured power amount 52 per time consumed by the air conditioner.

Referring to FIG. 5, the electronic apparatus 100 may acquire the actual time point $t_r$ when the measured temperature of the space S reaches the set temperature. Then, the electronic apparatus 100 may determine whether a defect exists in the air conditioner 200 based on the predicted power amount $W_p$ and the measured power amount $W_p$ consumed by the air conditioner 200 until the actual time point $t_r$. For example, if the measured power amount $W_p$ is not included within a predetermined power amount range C from the predicted power amount $W_p$, the electronic apparatus 100 may determine that a defect exists in the air conditioner 200. Alternatively, if a difference between the predicted power amount $W_p$ and the measured power amount is greater than or equal to a predetermined value, the electronic apparatus 100 may determine that a defect exists in the air conditioner 200.

Meanwhile, in FIGS. 4A, 4B, and 5, it is illustrated that the temperature or the power amount changes linearly according to the time, but this is merely an embodiment, and the temperature and the power amount can obviously be changed non-linearly.

Figure 6:
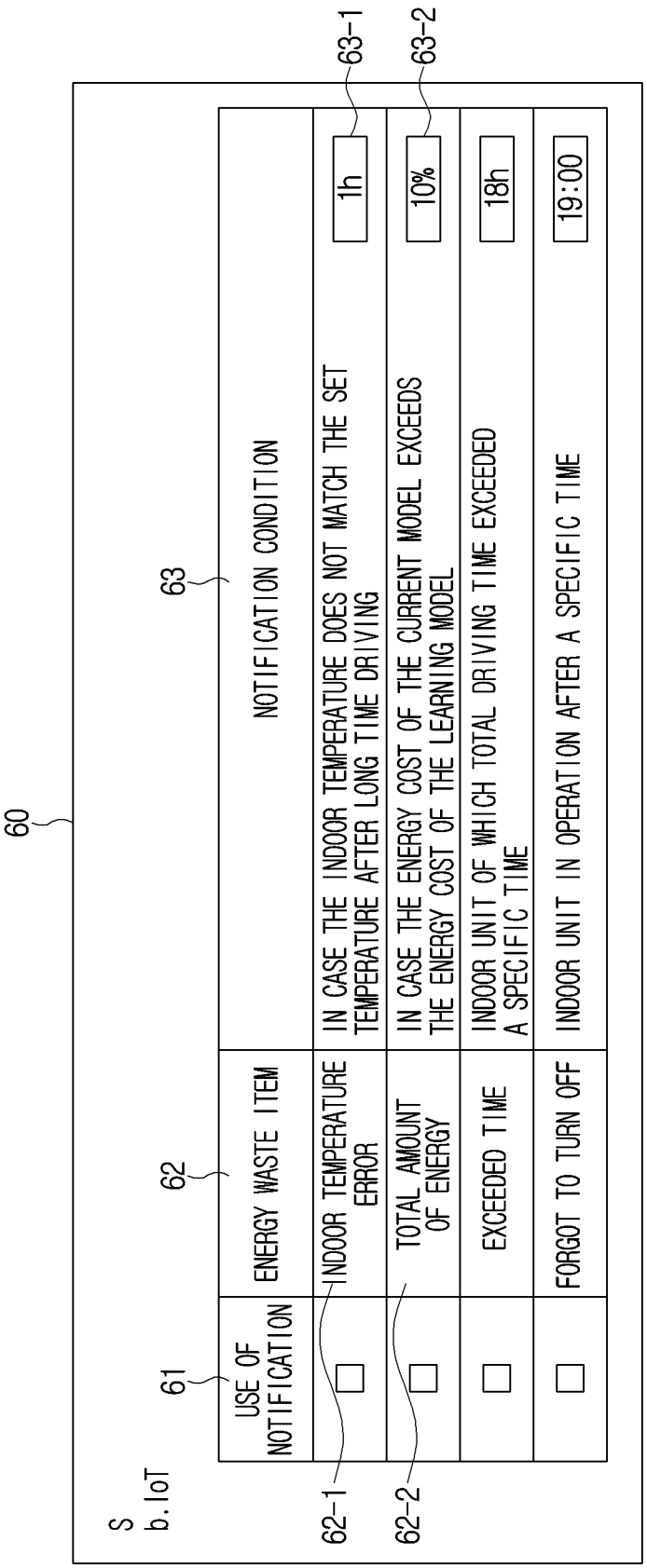
FIG. 6 is a diagram illustrating a user interface (UI) provided through a user device according to an embodiment of the disclosure.

FIG. 6 is a diagram illustrating a UI provided through a user device according to an embodiment of the disclosure.

Referring to FIG. 6, the user device 300 may display a menu 60 for setting conditions for generation of a notification signal by the electronic apparatus 100. The menu 60 may include a first item 61 for setting whether to use notifications, a second item 62 indicating the types of energy waste, and a third item 63 for setting notification conditions for the respective energy waste items included in the second item 62. In particular, the second item 62 may include an indoor temperature error item 62-1 and an energy total amount item 62-2. Also, the third item 63 may include a first UI element 63-1 for setting a notification condition for the indoor temperature error item 62-1 and a second UI element 63-2 for setting a notification condition for the energy total amount item 62-2. If a user command is acquired through the first UI element 63-1 and the second UI element 63-2, the electronic apparatus 100 may determine whether a defect exists in the air conditioner 200 based on the user command.

If it is determined that a defect exists in the air conditioner 200, the electronic apparatus 100 may generate a notification signal.

Referring to FIG. 6, for example, if a user command setting the first UI element 63-1 as one hour (1 h) is acquired, the electronic apparatus 100 may determine the predetermined time range A in FIG. 4A based on the user command. If the measured temperature 42 does not reach the set temperature Ts within one hour from the predicted time point $t_p$, the electronic apparatus 100 may determine that a defect exists in the air conditioner 200. As another example, if a user command setting the second UI element 63-2 as 10% is acquired, the electronic apparatus 100 may determine the predetermined power amount range C in FIG. 5 based on the user command. If the measured power amount $W_p$ exceeds 110% of the predicted power amount $W_p$, the electronic apparatus 100 may determine that a defect exists in the air conditioner 200.

Figure 7:
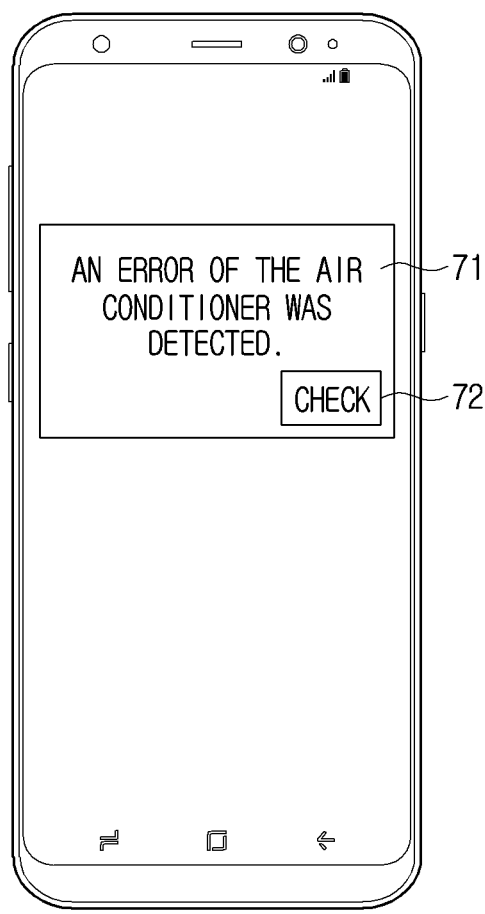
FIG. 7 is a diagram illustrating a scene of providing a notification message according to an embodiment of the disclosure.

FIG. 7 is a diagram illustrating a scene of providing a notification message according to an embodiment of the disclosure.

Referring to FIG. 7, when the electronic apparatus 100 generates a notification signal and transmits the signal to the user device 300, the user device 300 may display a notification message 71 notifying that a defect of the air conditioner 200 was detected. The notification message 71 may be provided in the form of a pop-up message. Also, in the notification message 71, a UI element 72 for providing detailed information for the detected defect may be displayed. For example, if the user selects the UI element 72, the user device 300 may display detailed information for the air conditioner 200 wherein a defect was detected (e.g., model information), detailed information for the defect (e.g., resistance to the cooling function), etc.

Figure 8:
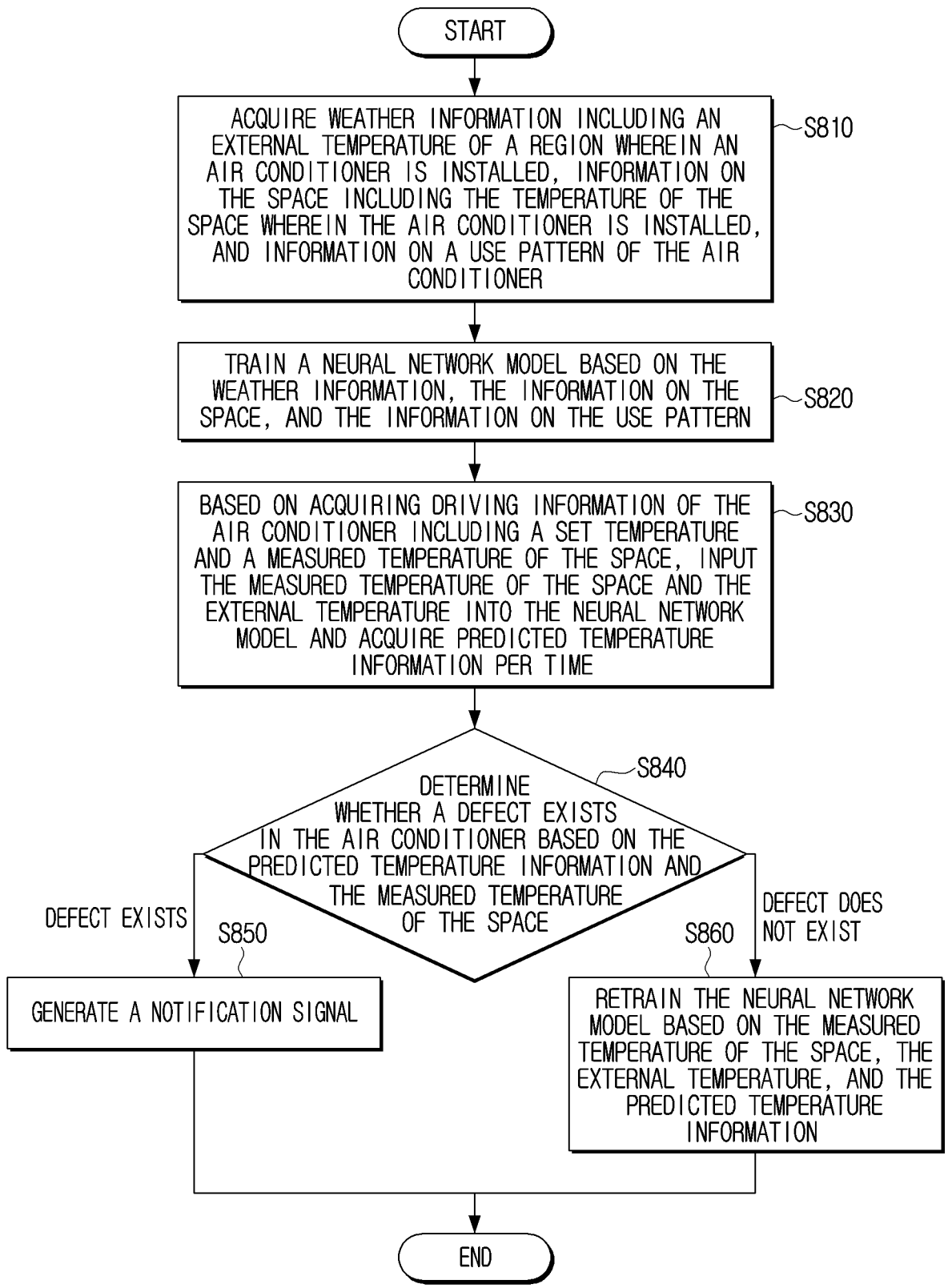
FIG. 8 is a flow chart illustrating a method for controlling an electronic apparatus according to an embodiment of the disclosure.

FIG. 8 is a flow chart illustrating a method for controlling an electronic apparatus according to an embodiment of the disclosure.

Referring to FIG. 8, the electronic apparatus 100 may acquire weather information including an external temperature of a region wherein the air conditioner is installed, information on the space including the temperature of the space where the air conditioner is installed, and information on a use pattern of the air conditioner in operation S810. The electronic apparatus 100 may acquire weather information for the present and the past, information on the space, and information on a use pattern.

Then, the electronic apparatus 100 may train a neural network model based on the weather information, the information on the space, and the information on the use pattern in operation S820. The neural network model may be trained in advance to acquire predicted temperature information per time (or the predicted temperature) based on the weather information, the information on the space, and the information on the use pattern, and stored in the electronic apparatus 100. The electronic apparatus 100 may train the neural network model by updating the parameter of the neural network model trained in advance based on the weather information of the current time point, the information on the space, and the information on the use pattern.

When driving information of the air conditioner including a set temperature and the measured temperature of the space are acquired, the electronic apparatus 100 may input the measured temperature of the space and the external temperature into the neural network model and acquire predicted temperature information per time for the space in operation S830. The electronic apparatus 100 may receive information related to a user's command for operating the air conditioner through the communication interface. For example, the electronic apparatus may acquire information on at least one of the set temperature set by the user, the driving mode, or the wind volume.

Then, the electronic apparatus 100 may determine whether a defect exists in the air conditioner based on the predicted temperature information and the measured temperature of the space in operation S840. The electronic apparatus 100 may acquire a predicted time point when the temperature of the space reaches the set temperature based on the predicted temperature information and the set temperature, and if the measured temperature of the space does not reach the set temperature within a predetermined time range from the predicted time point, the electronic apparatus 100 may determine that a defect exists in the air conditioner. Also, the electronic apparatus 100 may acquire a predicted time point when the temperature of the space reaches the set temperature based on the predicted temperature information and the set temperature, and if a difference between the measured temperature of the space and the set temperature is greater than or equal to a predetermined value at the predicted time point, the electronic apparatus 100 may determine that a defect exists in the air conditioner.

If it is determined that a defect exists in the air conditioner, the electronic apparatus 100 may generate a notification signal in operation S850. The generated notification signal may be transmitted to the user device 300, and a notification message corresponding to the generated notification signal may be output through the user device 300. Accordingly, the user may recognize the fact that a defect exists in the air conditioner, and thus satisfaction and convenience of the user can be improved. In contrast, if it is determined that a defect does not exist in the air conditioner, the electronic apparatus 100 may retrain the neural network model based on the measured temperature of the space, the external temperature, and the predicted temperature information in operation S860. That is, the electronic apparatus 100 may update the parameter of the neural network model based on the measured temperature of the space at the current time point, the external temperature, and the predicted temperature information. Accordingly, the accuracy of the predicted temperature information per time acquired through the neural network model can be improved.

Figure 9:
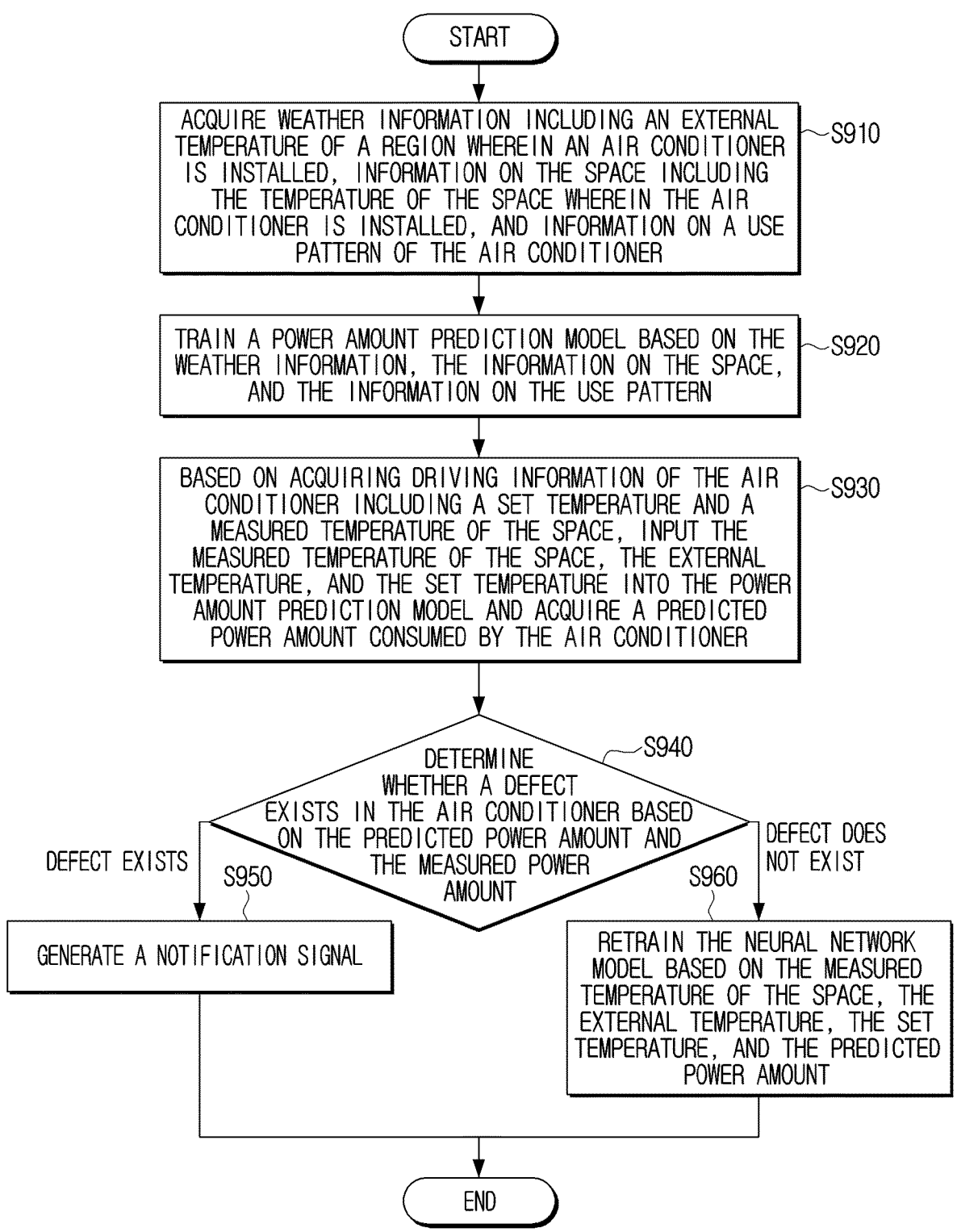
FIG. 9 is a flow chart illustrating a method for controlling an electronic apparatus according to an embodiment of the disclosure.

FIG. 9 is a flow chart illustrating a method for controlling an electronic apparatus according to an embodiment of the disclosure.

Referring to FIG. 9, the electronic apparatus 100 may acquire weather information including an external temperature of a region wherein the air conditioner is installed, information on the space including the temperature of the space where the air conditioner is installed, and information on a use pattern of the air conditioner in operation S910. Then, the electronic apparatus 100 may train a power amount prediction model based on the weather information, the information on the space, and the information on the use pattern in operation S920. The operations S910 and S920 may respectively correspond to S810 and S820 in FIG. 8.

When driving information of the air conditioner including a set temperature and the measured temperature of the space are acquired, the electronic apparatus 100 may input the measured temperature of the space, the external temperature, and the set temperature into the power amount prediction model and acquire a predicted power amount consumed by the air conditioner in operation S930. The electronic apparatus 100 may acquire a predicted power amount that is consumed for the current measured temperature of the space to reach the set temperature.

Then, the electronic apparatus 100 may determine whether a defect exists in the air conditioner based on the predicted power amount and the measured power amount in operation S940. The measured power amount means an actual power amount that was consumed for the current measured temperature of the space to reach the set temperature. The electronic apparatus 100 may acquire the measured power amount consumed by the air conditioner 200 by using an electricity meter. Then, in case a difference between the predicted power amount and the measured power amount is greater than or equal to a predetermined value, the electronic apparatus 100 may determine that a defect exists in the air conditioner 200.

If it is determined that a defect exists in the air conditioner 200, the electronic apparatus 100 may generate a notification signal in operation S950. In contrast, if it is determined that a defect does not exist in the air conditioner 200, the electronic apparatus 100 may retrain the power amount prediction model based on the measured temperature of the space, the external temperature, the set temperature, and the predicted power amount in operation S960. Accordingly, the power amount prediction model may be fitted to the space where the air conditioner 200 is installed. Afterwards, when the electronic apparatus 100 determines whether a defect exists by using the power amount prediction model, the accuracy of determination can be improved.

Figure 10:
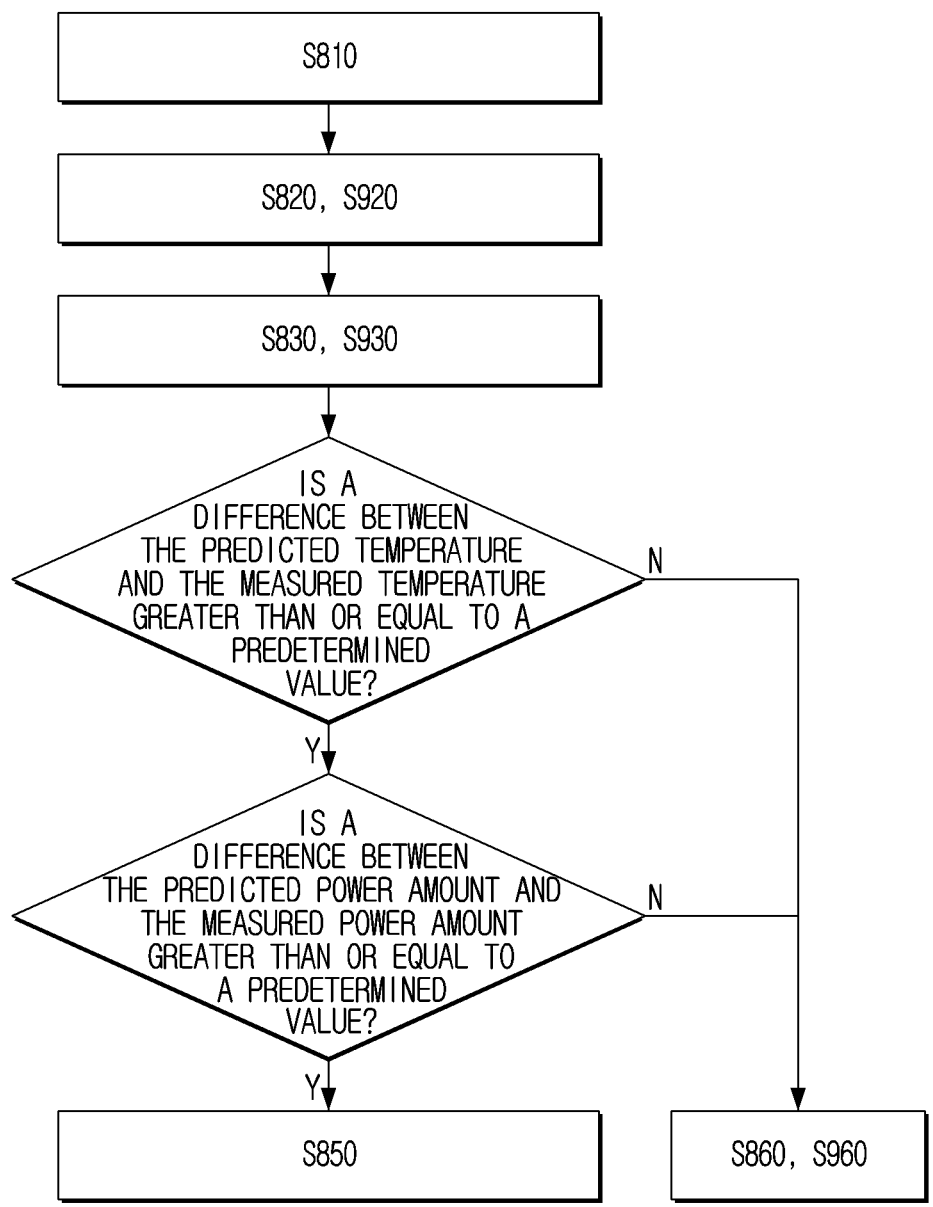
FIG. 10 is a sequence diagram for illustrating an operation of an air conditioner management system according to an embodiment of the disclosure.

FIG. 10 is a flow chart illustrating a method for controlling an electronic apparatus according to an embodiment of the disclosure. In FIG. 8, a method for determining whether a defect exists in the air conditioner by using a predicted temperature was described, and in FIG. 9, a method for determining whether a defect exists in the air conditioner by using a predicted power amount was described. Meanwhile, the electronic apparatus 100 may determine whether a defect exists in the air conditioner by using both of a predicted temperature and a predicted power amount.

Referring to FIG. 10, according to the operations S810, S820, and S920, the electronic apparatus 100 may acquire a neural network model to acquire a predicted temperature and a power amount prediction model to acquire a predicted power amount. Then, according to the operations S830 and S930, the electronic apparatus 100 may acquire a predicted temperature and a predicted power amount. Also, the electronic apparatus 100 may acquire a measured temperature and a measured power amount. If a difference between the predicted temperature and the measured temperature is greater than or equal to a predetermined value, the electronic apparatus 100 may determine whether a difference between the predicted power amount and the measured power amount is greater than or equal to a predetermined value. If the difference between the predicted power amount and the measured power amount is greater than or equal to the predetermined value, the electronic apparatus 100 may determine that a defect exists in the air conditioner 200, and generate a notification signal on operation S850. In contrast, in case the difference between the predicted temperature and the measured temperature is not greater than or equal to the predetermined value, the electronic apparatus 100 may retrain the neural network model in operations S860 and S960. Also, in case the difference between the predicted power amount and the measured power amount is not greater than or equal to the predetermined value, the electronic apparatus 100 may retrain the power amount prediction model in operations S860 and S960.

Figure 11:
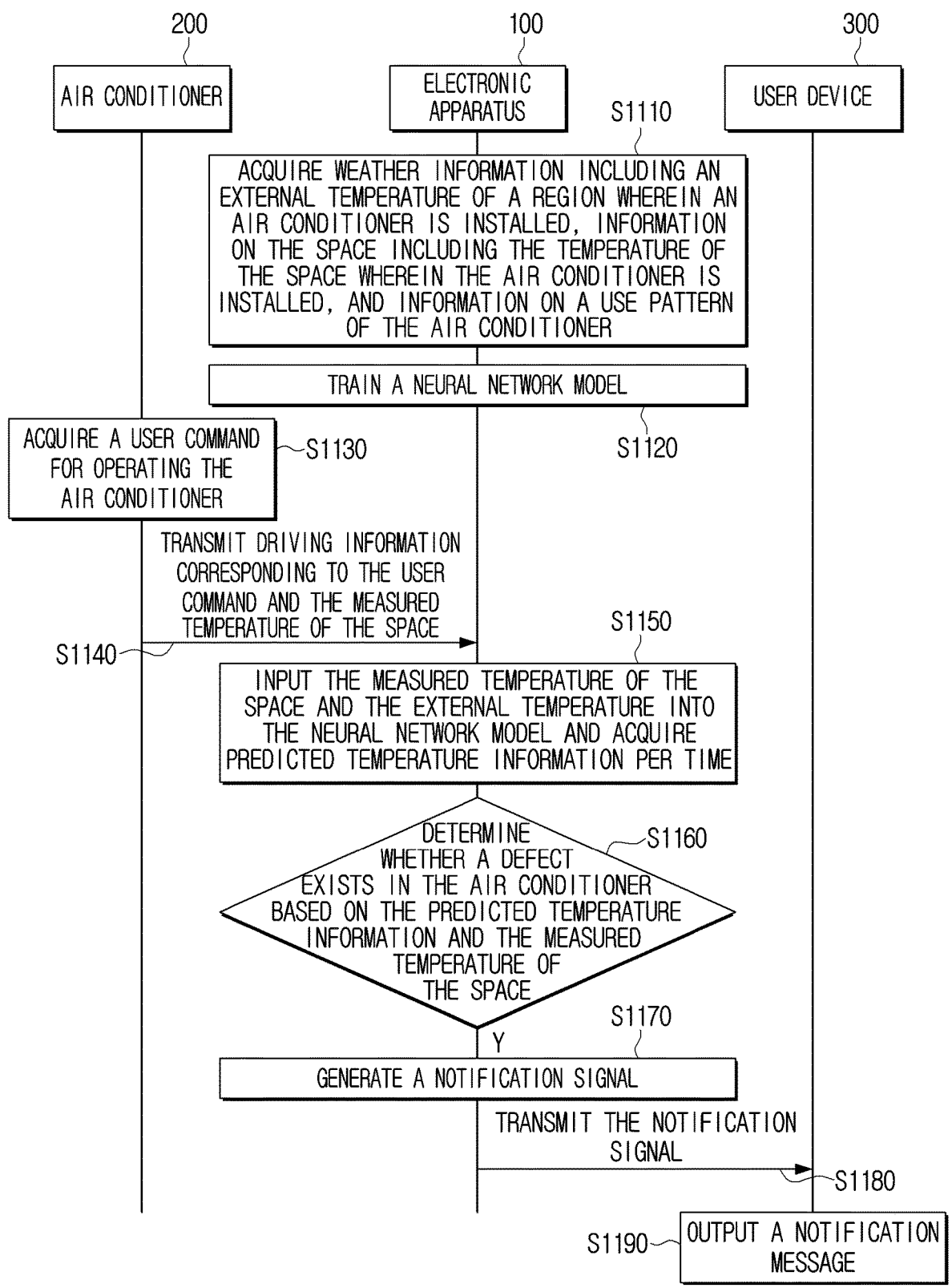
FIG. 11 is a sequence diagram for illustrating an operation of an air conditioner management system according to an embodiment of the disclosure.

FIG. 11 is a sequence diagram for illustrating an operation of an air conditioner management system according to an embodiment of the disclosure.

Referring to FIG. 11, the electronic apparatus 100 may acquire weather information including an external temperature of a region wherein the air conditioner is installed, information on the space including the temperature of the space where the air conditioner is installed, and information on a use pattern of the air conditioner in operation S1110.

Then, the electronic apparatus 100 may train a neural network model in operation S1120. The electronic apparatus 100 may train the neural network model based on the weather information, the information on the space, and the information on the use pattern.

The air conditioner 200 may acquire a user command for operating the air conditioner 200 in operation S1130. The air conditioner 200 may acquire driving information including a set temperature and the measured temperature for the space. Then, the air conditioner 200 may transmit the driving information corresponding to the user command and the measured temperature of the space to the electronic apparatus 100 in operation S1140. The air conditioner 200 may transmit the measured temperature of the space to the electronic apparatus 100 per predetermined time period (e.g., one minute).

When the measured temperature of the space is received, the electronic apparatus 100 may input the measured temperature of the space and the external temperature into the neural network model and acquire predicted temperature information per time for the space in operation S1150. Then, the electronic apparatus 100 may determine whether a defect exists in the air conditioner based on the predicted temperature information and the measured temperature of the space in operation S1160. If it is determined that a defect exists in the air conditioner 200, the electronic apparatus 100 may generate a notification signal in operation S1170. Then, the electronic apparatus 100 may transmit the generated notification signal to the user device 300 in operation S1180.

When the notification signal is received, the user device 300 may output a notification message corresponding to the notification signal in operation S1190. For example, the user device 300 may display a pop-up message. Accordingly, the user may recognize that a defect exists in the air conditioner 200.

Meanwhile, the various embodiments described above may be implemented in a recording medium that can be read by a computer or an apparatus similar to a computer, by using software, hardware, or a combination thereof. In some cases, the embodiments described in this specification may be implemented as a processor itself. According to implementation by software, the embodiments such as processes and functions described in this specification may be implemented as separate software modules. Each of the software modules can perform one or more functions and operations described in this specification.

Meanwhile, computer instructions for performing processing operations according to the aforementioned various embodiments of the disclosure may be stored in a non-transitory computer-readable medium. Computer instructions stored in such a non-transitory computer-readable medium may make the processing operations according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM, and the like.

Meanwhile, a storage medium that is readable by machines may be provided in the form of a non-transitory storage medium. The term 'non-transitory' only means that the device is a tangible device, and does not include a signal (e.g.: an electronic wave), and the term does not distinguish a case wherein data is stored semi-permanently in a storage medium and a case wherein data is stored temporarily. For example, 'a non-transitory storage medium' may include a buffer wherein data is temporarily stored.

Also, according to an embodiment of the disclosure, the method according to the various embodiments described in the disclosure may be provided while being included in a computer program product. A computer program product refers to a product, and it can be traded between a seller and a buyer. A computer program product may be distributed in the form of a storage medium that is readable by machines (e.g.: a compact disc read only memory (CD-ROM)), or it may be distributed directly between two user devices (e.g.: smartphones), and distributed on-line (e.g.: download or upload) through an application store (e.g.: Play Store™). In the case of on-line distribution, at least a portion of a computer program product (e.g.: a downloadable app) may be stored in a storage medium such as the server of the manufacturer, the server of the application store, and the memory of the relay server at least temporarily, or may be generated temporarily.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus controlling an air conditioner comprising:
a communication interface;
a memory storing at least one instruction; and
a processor,
wherein, when the at least one instruction is executed by the processor, the processor is configured to:
acquire weather information comprising an external temperature of a region where the air conditioner is installed and information on a space comprising a temperature of the space where the air conditioner is installed,
train a neural network model based on the weather information and the information on the space, where the information on the space includes information on a type of use of the space where the air conditioner is installed, information on a location within a building in which the space exists, information on a number and size of windows present in the space, and a number of occupants of the space,
based on acquiring driving information of the air conditioner comprising a set temperature and the acquired temperature of the space through the communication interface, input the acquired temperature of the space and the external temperature into the neural network model and acquire predicted temperature information per time for the space,
determine whether a defect exists in the air conditioner based on a difference between the predicted temperature information of the neural network model and the acquired temperature of the space, and based on determining that a defect exists in the air conditioner, generate a notification signal,
wherein, when the at least one instruction is executed by the processor, the processor is further configured to:
acquire a heat characteristic for the space based on the acquired temperature of the space and the external temperature, and
correct the predicted temperature information based on the heat characteristic, and
wherein the heat characteristic comprises a temperature distribution for the space where the air conditioner is installed.

2. The electronic apparatus of claim 1, wherein, when the at least one instruction is executed by the processor, the processor is further configured to:
acquire a predicted time point when the temperature of the space reaches the set temperature based on the predicted temperature information and the set temperature; and
based on the acquired temperature of the space not reaching the set temperature within a predetermined time range from the predicted time point, determine that a defect exists in the air conditioner.

3. The electronic apparatus of claim 1, wherein, when the at least one instruction is executed by the processor, the processor is further configured to:
acquire a predicted time point when the temperature of the space reaches the set temperature based on the predicted temperature information and the set temperature, and
based on a difference between the acquired temperature of the space and the set temperature being greater than or equal to a predetermined value at the predicted time point, determine that a defect exists in the air conditioner.

4. The electronic apparatus of claim 1, wherein, when the at least one instruction is executed by the processor, the processor is further configured to:
acquire a prestored neural network model trained to acquire predicted temperature information per time for the space based on the temperature of the space and the external temperature in the memory, and
train the neural network model by updating a parameter of the prestored neural network model based on the weather information, the information on the space, and information on a use pattern.

5. The electronic apparatus of claim 1, wherein the processor is configured to:
based on determining that a defect does not exist in the air conditioner, retrain the neural network model based on the temperature of the space, the external temperature, and the predicted temperature information.

6. The electronic apparatus of claim 1, wherein the information on the space comprises:
at least one of a use of the space and a size of the space, a location of the air conditioner inside the space, a number of windows present in the space, the sizes of the windows, or whether the windows are opened and closed.

7. The electronic apparatus of claim 1, wherein the driving information comprises:
at least one of the set temperature, a wind volume, or a driving mode.

8. The electronic apparatus of claim 1, wherein, when the at least one instruction is executed by the processor, the processor is further configured to:

control the communication interface to transmit the notification signal for providing a notification message to a user terminal.

9. The electronic apparatus of claim 1, wherein, when the at least one instruction is executed by the processor, the processor is further configured to:
acquire information on a use pattern of the air conditioner, and
train the neural network model based on the information on the use pattern of the air conditioner.

10. A method for controlling an electronic apparatus controlling an air conditioner, the method comprising:
acquiring weather information comprising an external temperature of a region where the air conditioner is installed and information on a space comprising a temperature of the space where the air conditioner is installed;
training a neural network model based on the weather information and the information on the space, where the information on the space includes information on a type of use of the space where the air conditioner is installed, information on a location within a building in which the space exists, information on a number and size of windows present in the space, and a number of occupants of the space;
based on acquiring driving information of the air conditioner comprising a set temperature and the acquired temperature of the space through a communication interface, inputting the acquired temperature of the space and the external temperature into the neural network model and acquiring predicted temperature information per time for the space;
determining whether a defect exists in the air conditioner based on a difference between the predicted temperature information of the neural network model and the acquired temperature of the space; and
based on determining that a defect exists in the air conditioner, generating a notification signal,
wherein the acquiring predicted temperature information comprises:
acquiring a heat characteristic for the space based on the acquired temperature of the space and the external temperature, and
correcting the predicted temperature information based on the heat characteristic, and wherein the heat characteristic comprises a temperature distribution for the space where the air conditioner is installed.

11. The method of claim 10, wherein the determining comprises:
acquiring a predicted time point when the temperature of the space reaches the set temperature based on the predicted temperature information and the set temperature; and
based on the acquired temperature of the space not reaching the set temperature within a predetermined time range from the predicted time point, determining that a defect exists in the air conditioner.

12. The method of claim 10, wherein the determining comprises:
acquiring a predicted time point when the temperature of the space reaches the set temperature based on the predicted temperature information and the set temperature; and
based on a difference between the acquired temperature of the space and the set temperature being greater than or equal to a predetermined value at the predicted time point, determining that a defect exists in the air conditioner.

13. The method of claim 10, wherein the training a neural network model comprises:
acquiring a prestored neural network model trained to acquire predicted temperature information per time for the space based on the temperature of the space and the external temperature in a memory; and
training the neural network model by updating a parameter of the prestored neural network model based on the weather information, the information on the space, and information on a use pattern.

14. The method of claim 10, wherein a condition for generating the notification signal is set in menu of a user device.

15. The method of claim 14, wherein the condition set in the menu is based on a first item for setting whether to use notifications, a second item indicating a type of energy waste and a third item for setting notification conditions for respective energy waste items included in the second item.

* * * * *